United States Patent
Oba et al.

(10) Patent No.: US 10,700,934 B2
(45) Date of Patent: *Jun. 30, 2020

(54) COMMUNICATION CONTROL DEVICE, COMMUNICATION CONTROL METHOD, AND COMPUTER PROGRAM PRODUCT

(71) Applicant: Kabushiki Kaisha Toshiba, Minato-ku (JP)

(72) Inventors: Yoshihiro Oba, Kawasaki (JP); Toru Kambayashi, Chigasaki (JP); Yoshikazu Hanatani, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 668 days.

This patent is subject to a terminal disclaimer.

(21) Appl. No.: 15/188,624

(22) Filed: Jun. 21, 2016

(65) Prior Publication Data
US 2016/0301572 A1    Oct. 13, 2016

Related U.S. Application Data

(63) Continuation of application No. PCT/JP2013/085009, filed on Dec. 26, 2013.

(51) Int. Cl.
*H04L 12/24* (2006.01)
*H04L 9/06* (2006.01)
(Continued)

(52) U.S. Cl.
CPC ........ *H04L 41/0893* (2013.01); *H04L 9/0836* (2013.01); *H04L 12/185* (2013.01);
(Continued)

(58) Field of Classification Search
CPC . H04L 41/0893; H04L 9/0836; H04L 12/185; H04L 9/0822; H04L 41/08;
(Continued)

(56) References Cited

U.S. PATENT DOCUMENTS

| | | | | |
|---|---|---|---|---|
| 6,735,313 | B1* | 5/2004 | Bleichenbacher | ..... H04H 60/23 348/E7.056 |
| 7,043,024 | B1* | 5/2006 | Dinsmore | ............. H04L 9/0836 380/278 |

(Continued)

FOREIGN PATENT DOCUMENTS

| JP | 2005-123678 | 5/2005 |
|---|---|---|
| JP | 2005-268926 | 9/2005 |

(Continued)

OTHER PUBLICATIONS

Author(s):(Manos Athanassoulis and Anastasia Ailamaki) Title: BFTree: Approximate Tree Indexing Date: Sep. 1-5, 2014 vol. 7, No. 14, pp. 12 (Year: 2014).*

(Continued)

*Primary Examiner* — Jeffrey C Pwu
*Assistant Examiner* — Ali H. Cheema
(74) *Attorney, Agent, or Firm* — Oblon, McClelland, Maier & Neustadt, L.L.P.

(57) ABSTRACT

According to an embodiment, a communication control device includes a receiving unit, a generating unit, and an output unit. The receiving unit receives input of a binary tree in which each of leaf nodes has an index assigned thereto, and receives input of a node ID that enable identification of a leaf node belonging to a group. The generating unit generates set information indicating a set of a predetermined number of partial trees of the binary tree. Each partial tree includes only the leaf node identified by the node ID. The generating unit generates range information of the indexes assigned to one or more leaf nodes of each partial tree included in the set. The output unit outputs the set information and the range information at least to a communication device corresponding to a leaf node belonging to the group.

13 Claims, 14 Drawing Sheets

(51) Int. Cl.
*H04L 9/08* (2006.01)
*H04L 12/18* (2006.01)
*H04L 12/26* (2006.01)
*G06F 16/22* (2019.01)

(52) U.S. Cl.
CPC ...... *H04L 41/0886* (2013.01); *G06F 16/2237* (2019.01); *H04L 9/0822* (2013.01); *H04L 9/0891* (2013.01); *H04L 43/04* (2013.01)

(58) Field of Classification Search
CPC ... H04L 41/0886; H04L 43/04; H04L 9/0891; H04L 9/08; H04L 9/0618; H04L 9/06; H04L 9/00; G06F 17/30958; G06F 16/2246; G06F 16/223; G06F 16/00; G06F 7/32
USPC ............... 380/45, 277, 278, 279, 281, 255; 370/256; 707/610, 753; 713/168
See application file for complete search history.

(56) References Cited

U.S. PATENT DOCUMENTS

| | | | | |
|---|---|---|---|---|
| 8,270,614 | B2* | 9/2012 | Kim | H04L 9/0891 380/278 |
| 9,684,710 | B2* | 6/2017 | Lokam | G06F 21/6227 |
| 2003/0142826 | A1* | 7/2003 | Asano | H04L 9/0836 380/277 |
| 2003/0161474 | A1* | 8/2003 | Matsuzaki | H04L 9/0836 380/277 |
| 2004/0133590 | A1* | 7/2004 | Henderson | G06F 16/2246 |
| 2006/0059179 | A1* | 3/2006 | Asano | H04L 9/0836 |
| 2007/0140480 | A1 | 6/2007 | Yao | |
| 2007/0263875 | A1* | 11/2007 | Kitaya | H04L 9/0836 380/279 |
| 2008/0152133 | A1* | 6/2008 | Suga | H04L 9/0836 380/45 |
| 2009/0210414 | A1* | 8/2009 | Shinjo | G06F 16/2246 |
| 2009/0232031 | A1* | 9/2009 | Vasseur | H04L 12/185 370/256 |
| 2010/0077201 | A1 | 3/2010 | Asano et al. | |
| 2010/0183150 | A1* | 7/2010 | Lee | H04L 9/0822 380/255 |
| 2010/0250560 | A1* | 9/2010 | Shinjo | G06F 7/32 707/753 |
| 2011/0145578 | A1 | 6/2011 | Asano et al. | |
| 2012/0257756 | A1* | 10/2012 | Huang | H04L 9/0836 380/281 |
| 2014/0380047 | A1* | 12/2014 | Denning | H04L 9/0822 713/168 |
| 2015/0188785 | A1 | 7/2015 | Hanatani et al. | |
| 2015/0324410 | A1* | 11/2015 | Glover | G06F 16/00 707/610 |
| 2016/0301572 | A1 | 10/2016 | Oba et al. | |
| 2017/0170958 | A1 | 6/2017 | Oba et al. | |

FOREIGN PATENT DOCUMENTS

| | | |
|---|---|---|
| JP | 2007-174083 | 7/2007 |
| JP | 2008-131076 | 6/2008 |
| JP | 2011-130012 | 6/2011 |
| JP | 2014-93666 | 5/2014 |
| WO | WO 2015/097834 A1 | 7/2015 |

OTHER PUBLICATIONS

An Efficient Group Key Management Using Code for Key Calculation for Simultaneous Join/Leave: CKCS by Melisa Hajyvahabzadeh, Elina Eidkhani, S. Anahita Mortazavi, and Alireza Nemaney Pour (IJCNC) vol. 4, No. 4, Jul. 2012 pp. 18 (Year: 2012).*

M.Baugher et al. "The Group Domain of Interpretation", The Internet Society, Jul. 2003, https://www.ietf.org/rfc/rfc3547.txt, 35 pages.

International Search Report dated Mar. 25, 2014 in PCT/JP2013/085009, filed on Dec. 26, 2013 (with English Translation).

Written Opinion dated Mar. 25, 2014 in PCT/JP2013/085009, filed on Dec. 26, 2013.

Japanese Office Action dated Jun. 14, 2016 in Patent Application No. 2015-554420 (with English translation).

Written Opinion dated Mar. 25, 2014 in PCT/JP2013/085009 (English translation only).

International Search Report dated Nov. 25, 2014 in PCT/JP2014/079138, filed on Oct. 31, 2014 (with English Translation).

Written Opinion dated Nov. 25, 2014 in PCT/JP2014/079138, filed on Oct. 31, 2014.

Dalit Naor et al. "Revocation and Tracing Schemes for Stateless Receivers," Cryptology ePrint Archive , 2001, pp. 35.

"P802.21™/D05 Draft Standard for Local and metropolitan area networks—Part 21: Media Independent Services Framework," IEEE 802.21d/D05, Sep. 2016, pp. 329.

M. Baugher et al., "The Group Domain of Interpretation", Network Working Group, http://www.ietf.org/rfc/rfc3547.txt, Jul. 2003, pp. 37.

* cited by examiner

FIG.9

```
def CreateCompleteSubtreeFragments(I, T, R, M):
        # Input I: List of indices of leaf nodes to be included in the group
        # Input T: The entire tree that covers all leaf nodes
        # Input R: Root node of the entire tree
        # Input M: Maximum number of subtrees in per fragment
        # Output O : List of (S, minr, maxr):
        #   S: Subtrees covering the group.
        #   minr: Lower bound of Subgroup Range
        #   maxr: Upper bound of Subgroup Range
        O=[]
        S=[]
        depth=int(math.log(len(T)+1,2)-1)

def rightmost_leaf_number(n):
                # Input n: subtree root node
                # Output y: rightmost leaf number under the subtree
                h=n.index.len  # hierarchy level of node n
                x=int(n.index.val, 2)  # node index in decimal
                y=(x+1)*(2**(depth-h))-1
                return y def check(n):
                # Input n: subtree root node
                # Output 0, 1
                #  0 : Some node in the subtree is a non-member of the group.
                #  1 : All nodes in the subtree are members of the group.
                global minr
                rv=0
                if n.left==None and n.right==None:  # n is leaf
                        if n.index.val in I:
                                S.append(n)
                                return 1
                        return 0
                # n is non-leaf
                lval=check(n.left)
                rval=check(n.right)
                if lval*rval>0:
                        S.remove(n.left)
                        S.remove(n.right)
                        S.append(n)
                        rv=1
                elif lval+rval>0:
                        if len(S) > M: # one fragment is ready
                                maxr=rightmost_leaf_number(S[M-1])
                                O.append((S[0:M], minr, maxr))
                                S[0:M]=[]   # Remove the appended subtrees
                                minr=maxr+1
                        rv=0
                if n==R: # Root node. len(S)>0
                        maxr=2**depth-1
                        O.append((S, minr, maxr))
                return rv
        check(R)
        return O
```

FIG.15

```
def CreateCompleteSubtreeFragments(I, T, R, M):
        # Input I: List of indices of leaf nodes to be included in the group
        # Input T: The entire tree that covers all leaf nodes
        # Input R: Root node of the entire tree
        # Input M: Maximum number of subtrees in per fragment
        # Output O : List of (S, minr, maxr):
        #   S: Subtrees covering the group.
        #   minr: Lower bound of Subgroup Range
        #   maxr: Upper bound of Subgroup Range
        O=[]
        S=[]
        depth=int(math.log(len(T)+1,2)-1)

def rightmost_leaf_number(n):
                # Input n: subtree root node
                # Output y: rightmost leaf number under the subtree
                h=n.index.len  # hierarchy level of node n
                x=int(n.index.val, 2)  # node index in decimal
                y=(x+1)*(2**(depth-h))-1
                return y def fragment(S):
                minr=0
                N=math.ceil(float(len(S))/M)
                i=0
                while i<N:
                        if i+1<N: # Non-last fragment
                                F=S[i*M:(i+1)*M] # Extract M subtrees
                                maxr=rightmost_leaf_number(F[-1])
                        else: # Last fragment
                                F=S[i*M:] # Extract remaining subtrees
                                maxr=2**depth-1
                        O.append((F, minr, maxr))
                        minr=maxr+1
                        i=i+1
                return O def check(n):
                # Input n: subtree root node
                # Output 0, 1
                # 0 : Some node in the subtree is a non-member of the group.
                # 1 : All nodes in the subtree are members of the group.
                if n.left==None and n.right==None:  # n is leaf
                        if n.index.val in I:
                                S.append(n)
                                return 1
                        return 0
                # n is non-leaf
                lval=check(n.left)
                rval=check(n.right)
                if lval*rval>0:
                        S.remove(n.left)
                        S.remove(n.right)
                        S.append(n)
                        return 1
                return 0
        check(R)
        O=fragment(S)
        return O
```

COMMUNICATION CONTROL DEVICE, COMMUNICATION CONTROL METHOD, AND COMPUTER PROGRAM PRODUCT

CROSS-REFERENCE TO RELATED APPLICATIONS

This application is a continuation of PCT international application Ser. No. PCT/JP2013/085009 filed on Dec. 26, 2013, which designates the United States; the entire contents of which are incorporated herein by reference.

FIELD

An embodiment described herein relates generally to a communication control device, a communication control method, and a computer program product.

BACKGROUND

In order to efficiently manage a large number of devices connected via a network, there are methods in which the devices are managed in groups. Regarding the methods for managing devices in groups, a static management method is known in which a predetermined group structure is used, and a dynamic management method is known in which groups are generated and deleted according to the situation.

BRIEF DESCRIPTION OF THE DRAWINGS

FIG. 9 is a diagram illustrating a pseudo code for performing the generation operation in the case of priority to the left side;

FIG. 15 is a diagram illustrating a pseudo code for performing the generation operation according to the first modification example in the case of priority to the left side.

DETAILED DESCRIPTION

Figure 1:
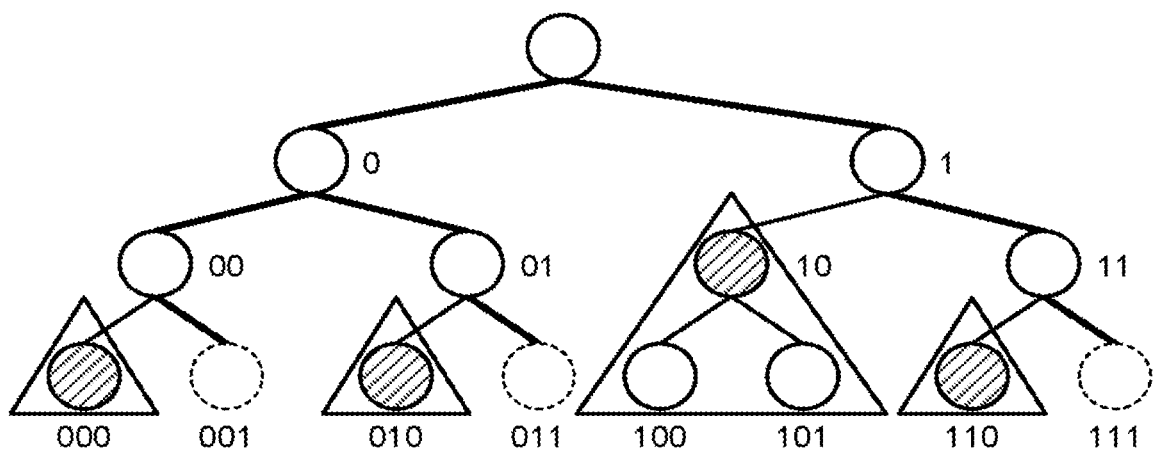
FIG. 1 is a diagram illustrating an exemplary structure of a group management tree according to an embodiment.

According to an embodiment, a communication control device includes a receiving unit, a generating unit, and an output unit. The receiving unit receives input of a binary tree in which each of leaf nodes has an index assigned thereto, and receives input of a node ID that enable identification of a leaf node belonging to a group. The generating unit generates set information indicating a set of a predetermined number of partial trees of the binary tree. Each partial tree includes only the leaf node identified by the node ID. The generating unit generates range information of the indexes assigned to one or more leaf nodes of each partial tree included in the set. The output unit outputs the set information and the range information at least to a communication device corresponding to a leaf node belonging to the group.

An embodiment will be described below in detail with reference to the accompanying drawings.

The Group Domain of Interpretation (GDOI) represents a technology in which participation and withdrawal of group members as well as secure distribution of group keys are performed using multicasting. In GDOI, it is possible to create groups, update groups, and distribute group keys. However, in GDOI, every time a group member is updated, key information (LKH_DOWNLOAD_ARRAY) having a hierarchical structure is updated in almost all members. For that reason, in the case in which a single communication device belongs to a plurality of groups, the individual communication device needs to hold a plurality of LKH_DOWNLOAD_ARRAY, thereby making efficient management a difficult task to perform.

In that regard, in the present embodiment, group operations are performed using the media key block (MKB) technology. As a result of using MKBs, affiliation to a plurality of groups can be efficiently managed using a single device key (a key ring equivalent to LKH_DOWNLOAD_ARRAY).

For example, as a result of using a group management tree (described later in detail), it is possible to obtain range information indicating the range of communication devices belonging to a group, and to obtain an MKB (MKB fragments) that enables management of the communication devices falling in the range indicated by the range information. Meanwhile, group affiliation can be managed (determined) even without using MKBs. For example, as long as set information (described later in detail) and range information generated from a group management tree can be obtained, it is possible to determine whether or not a communication device belongs to a group. In this case, an MKB (MKB fragments) need not be generated.

An MKB represents data that, when operations are performed using the device key corresponding thereto, enables derivation of a media key for the purpose of decoding the contents recorded in a medium. An MKB includes one or more elements. A typical MKB includes one or more cipher texts (elements) that are generated by encrypting a single media key using one or more device keys. Moreover, an MKB can include information that enables identification of the device key to be used in processing each cipher text. The number of cipher texts included in an MKB is dependent on the corresponding device key. Hence, depending on the corresponding device key, an MKB may sometimes include an enormous number of cipher texts as elements.

In the present embodiment, a media key obtained as a result of processing an MKB is used as a group key that is shared among one or more communication devices belonging to the group. That is, such an MKB is distributed which enables derivation of the group key, by performing operations using the device keys held by the communication devices belonging to the group. In this way, making use of the fact that the group key can be distributed only to the communication devices belonging to the group, group management of the communication devices is achieved. Since the media key is used as the group key, an MKB can be alternatively expressed as a group key block (GKB).

In the case of performing group management (operations) using an MKB, control is performed in such a way that a member that was able to process the MKB and retrieve the group key belongs to the corresponding group (if that member is not belonging to the corresponding group at present, it newly participates in the group). Moreover, control is performed in such a way that a member that failed in obtaining a group key does not belong to the corresponding group (if that member is belonging to the corresponding group at present, it withdraws from the group).

However, if the number of target members becomes enormously large, it is likely that the MKB for group operations becomes extremely large in size. Thus, if the MKB is distributed as it is in a communication network, it is likely that the communication load becomes extremely large.

In that regard, in the present embodiment, in order to reduce the network load, an MKB that includes a plurality of cipher texts as elements is sent after being divided. However, under the premise of the group control method described above, even if an MKB is sent after being divided simply on the basis of cipher texts, there are times when the group control cannot be performed as intended. For example, if a communication device receives an MKB in the divided form but cannot obtain the group key from that MKB, then the communication device withdraws from the group. However, in reality, an MKB that would be processible by the communication device for obtaining the group key may arrive at a latter timing.

In order to avoid such a situation, an MKB is attached with information that enables deciding on the set of communication devices to be subjected to group operations using that MKB. For example, the range of device IDs enabling identification of the target communication devices can be used as the information that enables deciding on the set of communication devices. For example, in the case in which numerically successive device IDs are assigned, a first device ID and a second device ID can be used to express the set of device IDs belonging to the range identified by the first device ID and the second device ID. Herein, device IDs from the first device ID to the second device ID belong to the set. Meanwhile, if the device IDs are assigned according to a rule; then, as described earlier, the range can expressed using two device IDs, and device IDs within that range can be identified according to the rule or it can be determined whether or not a device ID is included in that range. A communication device that receives an MKB attached with information enabling deciding on the range of communication devices performs operations as given in the following pseudo code.

```
check whether or not the communication device is included
    in the specified range;
    if (included in the set){
        process the MKB;
        if (the group key is successfully obtained){
            if (currently belonging to the group)
                update the group;
```
```
        }
        else {   if (currently not belonging to the group){
            participate in the group;
        }
    }
}
else {
    if (currently belonging to the group){
        withdraw from the group;
    }
    }
}
```

The communication device checks whether or not the communication device itself is included in the specified set (range). If included in the specified set, the communication device processes the MKB using the device key held therein and successfully obtains the group key; and, if it is already participating in the group, updates information of the participating group using the derived group key. On the other hand, if the communication device successfully obtains the group key but is not participating in the group, it participates in the group. If the communication device fails in obtaining the group but is already participating in the group, it withdraws from the group.

In this way, in the present embodiment, firstly, the communication device checks whether or not the communication device itself is the target device for group operations. If it is not the target device for group operations, the communication device does not perform group operations. As a result, also using an MKB in the divided form, it becomes possible to ensure that unintentional group withdrawal does not occur.

Given below is the explanation of a structure of an MKB used in the present embodiment. FIG. 1 is a diagram illustrating an exemplary structure of the group management tree that is used in an MKB according to the present embodiment. As illustrated in FIG. 1, in the present embodiment, a group management tree is used that has the complete binary tree structure according to the Complete Subtree (CS) method. For example, the complete binary tree either can be a tree covering all communication devices in the target system (a complete binary tree T) or can be a tree that covers a set of only some communication devices from among all communication devices in the target system (a partial tree T' of the complete binary tree T). The following explanation with reference to FIG. 1 is given under the assumption that the complete binary tree T is used.

As described earlier, each communication device has a unique device ID in the target system. Each leaf node of the complete binary tree T corresponds to a single communication device. Thus, managing the communication devices in groups can be translated as managing the leaf nodes in groups.

A leaf node has an index which is equivalent to the device ID of the corresponding communication device. The leaf nodes illustrated by dashed-line circles represent nodes (revoke nodes) that have been revoked (withdrawn from the group). Heavy lines represent edges in the paths from the root to the revoke nodes. Triangles represent partial trees (partial trees s) that include only the unrevoked leaf nodes. The filled nodes represent the root node of the respective partial trees s.

Each node in the complete binary tree T may be assigned with a different cryptographic key (node key). Each communication device may have a device key, which includes node keys assigned to the nodes in the path from the root node of the complete binary tree T to the corresponding leaf node, set therein in advance.

Meanwhile, alternatively, assignment of node keys and setting of device keys need not be performed. For example, in the case of managing groups without using MKBs as described earlier, since MKBs need not be generated, assignment of node keys and setting of device keys becomes redundant.

Meanwhile, to each node, at least information (a node ID) enabling identification of that node is assigned as an attribute. A node ID is expressed as, for example, (d (node depth), b (bitmap)). The depth d of a node n is expressed as $(H_T-H_n)$. Herein, the node n represents each node included in the complete binary tree T. Moreover, $H_T$ represents the height of the complete binary tree T, and $H_n$ represents the height of the node n. Regarding the node identified by the node ID (d, b), the index index(b, d) is expressed as the value of first d number of bits of the bitmap b.

The bitmap b is, for example, a value including one or more of "0" or "1" as illustrated in FIG. 1. Regarding the path from the root node to a leaf node in the complete binary tree T, the index illustrated in FIG. 1 is obtained by assigning "0" when the path moves to the left and by assigning "1" when the path moves to the right.

An MKB generated from the group management tree includes the following elements, for example. Herein, i represents the root node of the partial tree s.

(index of node i, Enc(node key of node i, group key))

In the example of the group management tree illustrated in FIG. 1, an MKB including the following four elements is generated. The four elements respectively correspond to 000, 010, 10, and 110. Herein, Kg represents a group key, and Enc(k(000), Kg) represents, for example, data obtained by encrypting Kg using k(000).

(000, Enc(k(000), Kg), (010, Enc(k(010), Kg), (10, Enc(k(10), Kg), (110, Enc(k(110), Kg)

In the present embodiment, an MKB having such a structure is divided into a plurality of MKBs (MKB fragments) each of which includes some of the elements; and the MKB fragments obtained by division are sent to the communication devices via multicast communication or broadcast communication.

Figure 2:
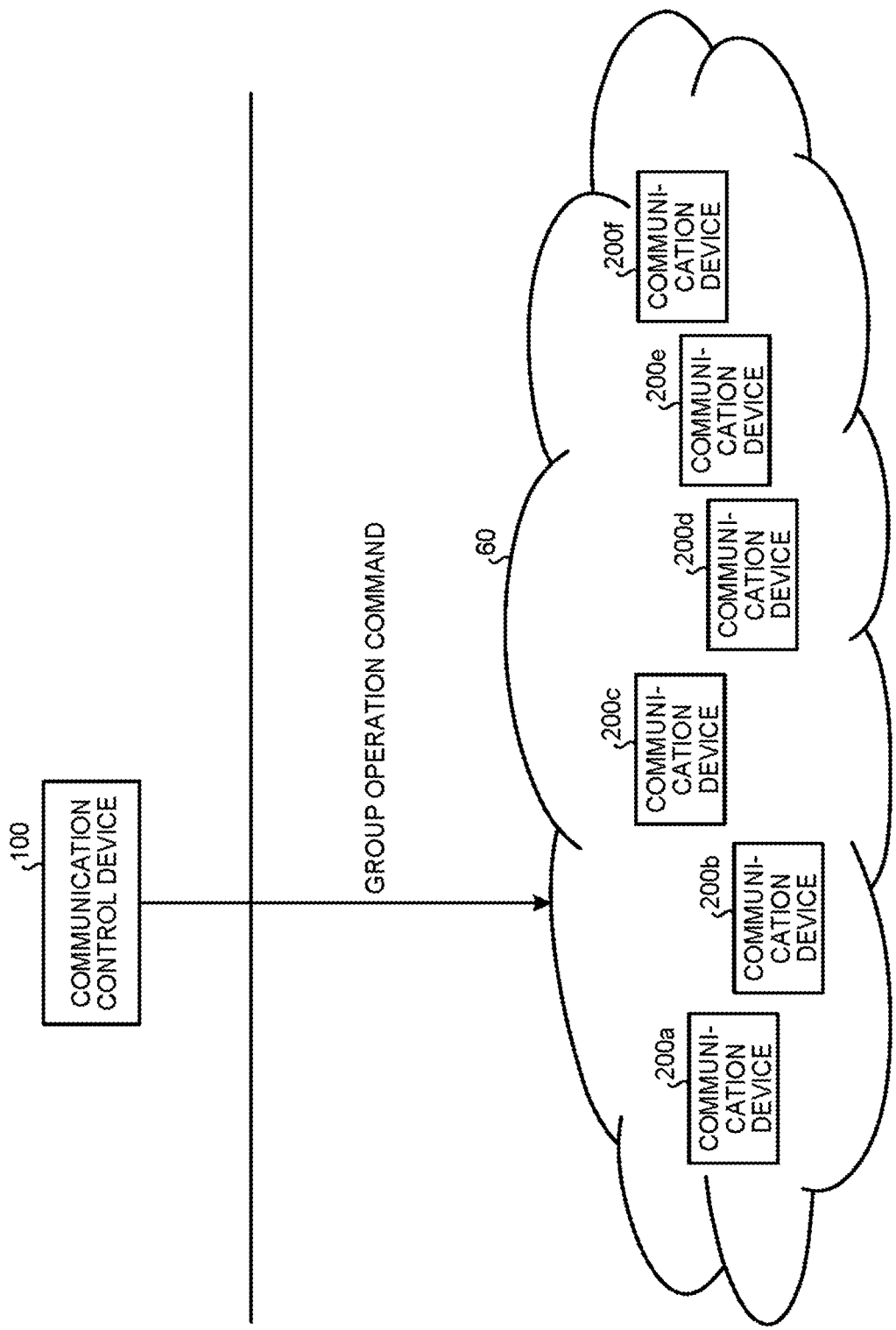
FIG. 2 is a block diagram of a communication system according to the embodiment.

Given below is the explanation of the details of the present embodiment. FIG. 2 is a block diagram illustrating an exemplary configuration of a communication system according to the present embodiment. As illustrated in FIG. 2, in the communication system according to the present embodiment, communication devices 200a to 200f are connected to a communication control device 100 via a network 60. Herein, the network 60 can have any network form such as the Internet. Thus, the communication devices 200a to 200f need not be directly connected to the communication control device 100.

Meanwhile, there need not be only a single communication control device 100, and the configuration may have two or more communication control devices. The communication devices 200a to 200f have an identical configuration. Hence, in the following explanation, simply the term "communication device 200" is used. Moreover, the number of communication devices 200 is not limited to six.

As illustrated in FIG. 2, in the present embodiment, the communication control device 100 sends a group operation command to each communication device 200. A group operation command contains, for example, set information and range information (for example, the range of device IDs). Moreover, a group operation command may also include the group ID that enables identification of the post-updating group.

The set information represents information about a set containing a predetermined number of partial trees (for example, the partial trees s illustrated in FIG. 1) which include only such leaf nodes (corresponding to the communication devices) which belong to a group. For example, the set information can also contain an MKB in the divided form (MKB fragments), so that the communication devices corresponding to the leaf nodes of the partial trees included in the set can derive the group key. In this way, in the present embodiment, instead of sending an MKB in entirety, MKB fragments that are obtained by division corresponding to sets of the set information, each of which is generated to contain a predetermined number of partial trees s, are sent to the communication devices 200.

The range information indicates the range of indexes assigned to the leaf nodes of each partial tree included in the set indicated by the set information. As described earlier, since an index is equivalent to the device ID of the corresponding communication device, the range information enables identification of the range of device IDs of the communication devices to be subjected to group operations. The details regarding the method of generating the set information and the range information are given later.

Figure 3:
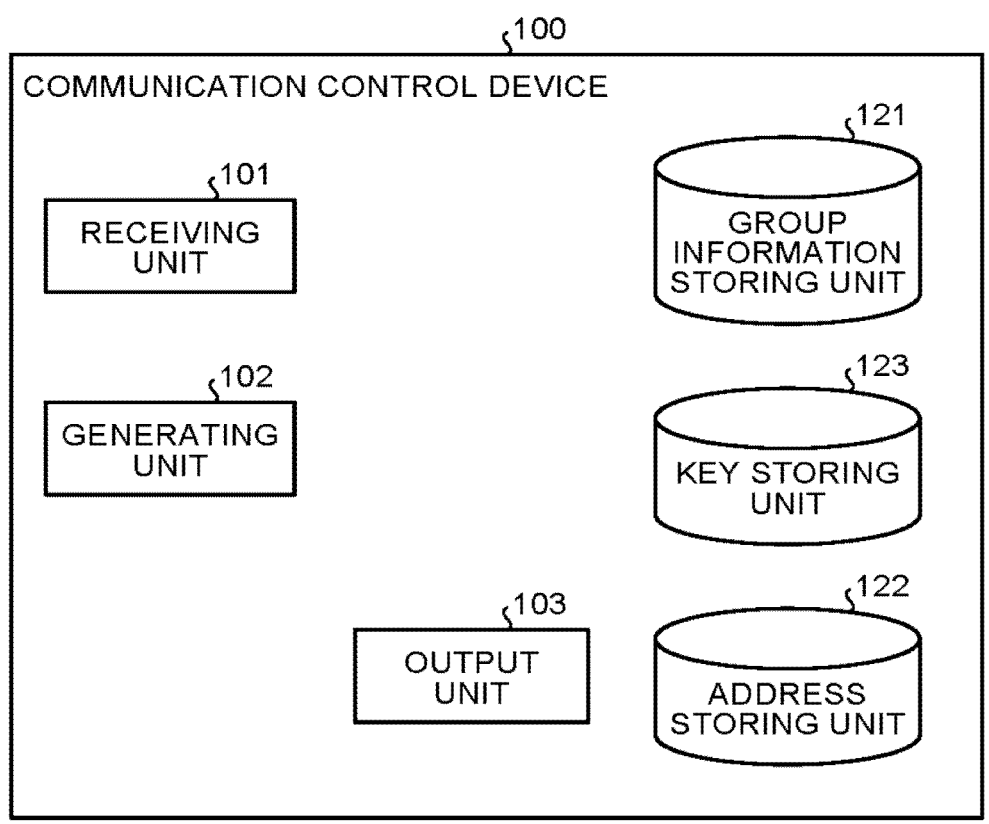
FIG. 3 is a block diagram of a communication control device according to the embodiment.

FIG. 3 is a block diagram illustrating a configuration example of the communication control device 100. As illustrated in FIG. 3, the communication control device 100 includes a group information storing unit 121, an address storing unit 122, a key storing unit 123, a receiving unit 101, a generating unit 102, and an output unit 103.

The group information storing unit 121 stores therein group information that contains group IDs of groups to which one or more communication devices 200 belong, and that contains device IDs enabling identification of the communication devices 200 belonging to the groups identified by the group IDs. That is, the group information storing unit 121 stores group IDs in a corresponding manner to device IDs of the communication devices 200 belonging to the groups identified by the group IDs.

In the present embodiment, in the group information storing unit 121, one or more group IDs are stored in advance. However, alternatively, the group information storing unit 121 may not be disposed, and group operations can be performed based on the group information received from an external device.

The address storing unit 122 stores therein information (multicast group IDs or multicast addresses), which enables identification of multicast groups to which one or more communication devices 200 belong, in a corresponding manner to the device IDs of the communication devices 200 belonging to the multicast groups. Herein, multicast groups represent an example of groups that are managed independently of the groups to be subjected to group operations using MKBs. Moreover, a multicast address represents, for example, an address for sending information to the communication device 200 having the corresponding device ID. Meanwhile, in the case of not using multicast communication (for example, in the case of using broadcast communication), the address storing unit 122 may not be disposed.

In the present embodiment, the address storing unit 122 stores therein, in advance, the information enabling identification of multicast groups. However, alternatively, the configuration can be such that, based on information received from an external device, information is newly added in the address storing unit 122 or the already-stored information is updated.

The key storing unit 123 stores therein the device keys that are assigned to the communication devices 200. When MKBs are generated according to the CS method, the key storing unit 123 can store the devices keys in a corresponding manner to the nodes of the tree structure. Meanwhile, in the case of only managing groups without using MKBs as described earlier, the key storing unit 123 may not be disposed.

The receiving unit 101 receives input of a variety of information used in the communication control device 100. For example, the receiving unit 101 receives a variety of information from external devices such as the communication devices 200. For example, the receiving unit 101 receives requests for group control and receives information specifying the targets for group control. A request for group control represents a request for newly creating a group or a request for updating a group (changing the communication devices 200 belonging to a group). For example, the receiving unit 101 can be configured to receive the group ID of the target group for operations and the device ID of the communication device 200 to be added to the group as input by an operator using an operating unit (not illustrated) such as a keyboard. Meanwhile, group control can be performed not only when a request for group control is received from an external device, but can be performed also when the necessity determination regarding group control is done in the communication control device 100 and group control is determined necessary.

The receiving unit 101 receives input of the group management tree to be processed that has the complete binary tree structure (either the complete binary tree T representing the entire tree or the partial tree T' of the complete binary tree T), as well as receives input of the node IDs of the leaf nodes corresponding to the communication devices 200 belonging to the group. Herein, since each leaf node corresponds to one of the communication devices 200, it is alternatively possible to receive input of the device IDs of the communication devices 200 belonging to the group. Then, the receiving unit 101 can obtain the node IDs of the nodes corresponding to the communication devices 200 having the input device IDs. The receiving unit 101 sends, to the generating unit 102, the group management tree having the complete binary tree structure, the node IDs, a request for group control, and information specifying the targets for group control (input information).

The generating unit 102 generates information to be used in group operations. For example, the generating unit 102 generates the set information and the range information described earlier. The generating unit 102 traces a group management tree having the complete binary tree structure, and generates the range information while calculating the set information. For example, the generating unit 102 repeatedly performs, either from the leftmost leaf node toward the rightmost leaf node or from the rightmost leaf node toward the leftmost leaf node, a tracing operation that includes an operation of obtaining set information, which indicates a set of a predetermined number of (M (natural number)) partial trees (partial trees of the group management tree) each including only the leaf nodes identified by node IDs, and an operation of obtaining the range information of the indexes of the leaf nodes included in the obtained set. As a result, the amount of calculation can be considered as $O(L)$ (where L represents the number of leaf nodes). Meanwhile, the details of the generation operation performed by the generating unit 102 are given later.

The output unit 103 outputs the set information and the range information at least to the communication devices 200 corresponding to the leaf nodes belonging to the group. As described earlier, the set information can also contain key information (MKB fragments) that enables the communication devices 200, which correspond to the leaf nodes of the partial trees included in the set, to derive the group key. For example, as described earlier, an MKB fragment is expressed in the format of (index of node i, Enc(node key of node i, group key)).

For example, the output unit 103 sends, via multicasting, a group operation message including the set information and the range information to the multicast groups to which belong the communication devices 200 belonging to the group. In this way, the output of the output unit 103 is allowed to reach even those communication devices 200 which are not to be subjected to a group change. Hence, as compared to a case in which the output is not allowed to reach, it becomes possible to reduce the calculation cost required for the determination of the output destinations by the output unit 103.

The output unit 103 can be configured to output the abovementioned information to such multicast groups that include the communication devices 200 included in the pre-updating group but are not included in the post-updating group. Although such communication devices 200 belong to a multicast group, they cannot correctly process MKBs and hence withdraw from the post-updating group. In this way, a command for withdrawing from the group can be issued using an MKB in the divided form. As a result of issuing such a command, the communication devices 200 can appropriately manage the information which needs to be retained.

Alternatively, a command for withdrawal as described above need not be sent to the communication devices 200 that are not included in the post-updating group. That is because the communication devices 200 that are not included in the post-updating group cannot derive the post-updating group key in response to a command for updating, and hence cannot participate in the post-updating group. As a result of such a configuration, the number of commands that need to be issued by the communication control device 100 may be reduced.

The output unit 103 outputs the output information to such a set of communication devices 200 which represents the set (group) of the communication devices 200 managed independently of the target groups for group operations using MKBs and which includes at least all communication devices 200 subjected to group updating. Herein, a set of communication devices 200 implies a collection of a plurality of communication devices 200, and need not always match with the group assigned with a group ID. Examples of a set of communication devices 200 include a set of communication devices 200 that receive data via multicast communication; and a set of communication devices 200 that receive data via broadcast communication, that is, a set of all communication devices 200. For example, the output unit 103 can send the output information using one or more multicast communications or broadcast communications to a set of communication devices 200 that include a device ID list or to a group. In the case of sending the output information using multicast communication, the output unit 103 sends the output information to one or more addresses (multicast addresses) that, from among the addresses stored in the address storing unit 122, are associated to the target device IDs for distribution.

Figure 4:
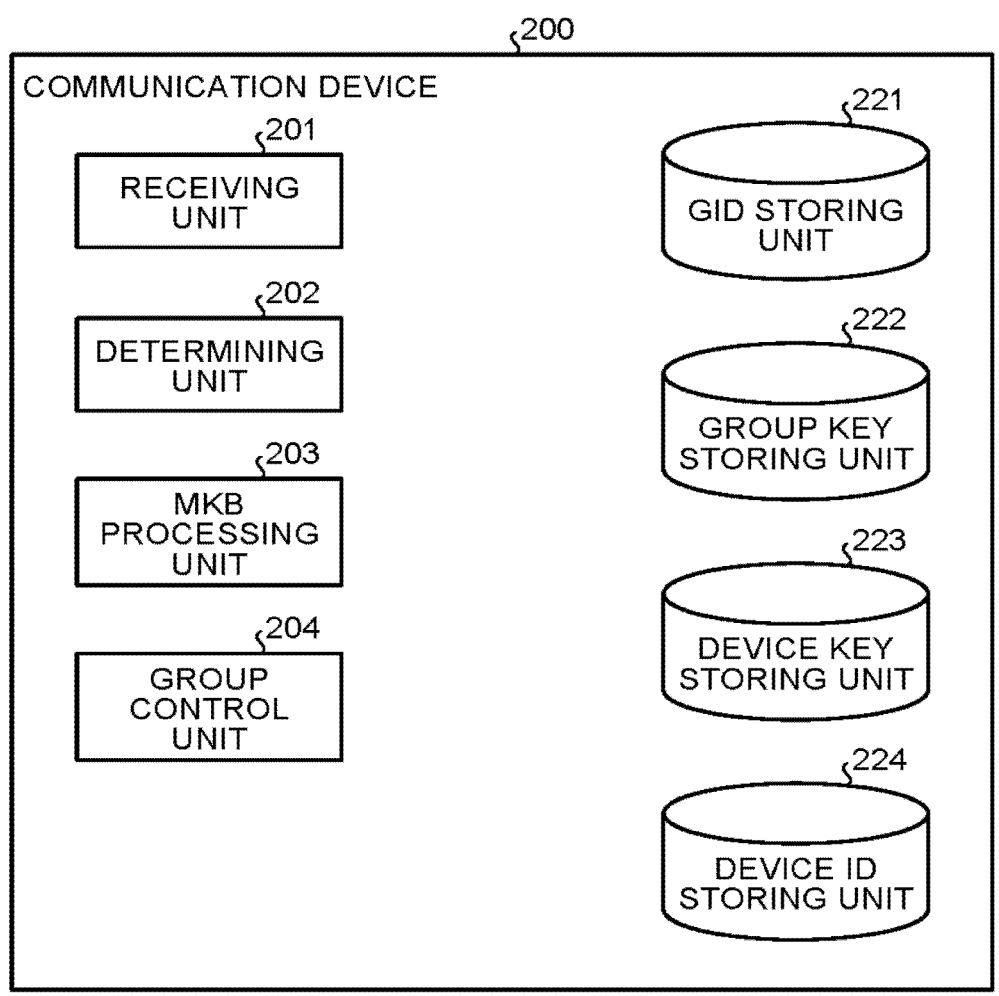
FIG. 4 is a block diagram of a communication device according to the embodiment.

FIG. 4 is a block diagram illustrating a configuration example of the communication device 200. As illustrated in FIG. 4, the communication device 200 includes a GID storing unit 221, a group key storing unit 222, a device key storing unit 223, a device ID storing unit 224, a receiving unit 201, a determining unit 202, an MKB processing unit 203, and a group control unit 204. In the case of not using MKBs, the group key storing unit 222 and the device key storing unit 223 need not be disposed.

The GID storing unit 221 stores therein the group ID (GID) of the group to which the corresponding communication device 200 belongs. The group key storing unit 222 stores therein the group key of the group identified by the group ID stored in the GID storing unit 221. The device key storing unit 223 stores therein the device key of the corresponding communication device 200. The device ID storing unit 224 stores therein the device ID of the corresponding communication device 200.

The receiving unit 201 receives a variety of information from external devices such as the communication control device 100 and the other communication devices 200. For example, the receiving unit 201 receives a group operation message from the communication control device 100. Moreover, the receiving unit 201 receives output information via multicast communication and broadcast communication. Then, the receiving unit 201 determines whether or not the received message is a group operation message. If the received message is not a group operation message, the message is sent to another module (not illustrated) that needs to process the message. When the received message is a group operation message, the data of the message is sent to the determining unit 202.

The determining unit 202 determines whether or not the range information specified in a group operation message contains the device ID stored in the device ID storing unit 224. If the device ID is not included, it implies that the communication device 200 is not the target device for group operation messages. Hence, the operations with respect to the group operation message are stopped. On the other hand, when the device ID is included, it implies that the communication device 200 is the target device for group operation messages. Hence, the group operation message is sent to the MKB processing unit 203.

When it is determined that the device ID stored in the device ID storing unit 224 is included in the range information, the MKB processing unit 203 performs MKB processing for generating a group key based on the set information (the MKB fragments) specified in the group operation message and based on the device key stored in the device key storing unit 223.

For example, when a MKB fragment is expressed as (index of node i, Enc(node key of node i, group key)) as mentioned earlier, the MKB processing unit 203 generates a group key using Dec(node key of node i, MKB fragment).

If a group key can be obtained as a result of the MKB processing, it implies that the communication device 200 belongs to the group identified by the GID. Then, the MKB processing unit 203 sends the GID and the obtained group key to the group control unit 204.

Meanwhile, the method for determining the affiliation to a group is not limited to this method. For example, in the case of using set information that does not contain MKB fragments, the communication device 200 can be determined to belong to the group if the node index (d, b) having the bitmap of the device ID of the communication device 200 matching with the prefix upper d number of bits is included in the set information.

The group control unit 204 stores the GID in the GID storing unit 221, and stores the group key in the group key storing unit 222. If an already-stored GID is present, the group control unit 204 updates the GID stored in the GID storing unit 221 with the GID specified in the group operation message.

Meanwhile, if the group key cannot be obtained as a result of the MKB processing, it implies that the communication device 200 does not belong to the group identified by the GID. Thus, in case the communication device 200 is belonging to the group, it needs to withdraw from the group. For that reason, the MKB processing unit 203 sends a notification about the failure to obtain the group key to the group control unit 204.

The group control unit 204 empties the GID storing unit 221 and the group key storing unit 222. If the GID and the group key are already stored, the group control unit 204 deletes them.

Meanwhile, each of the abovementioned storing units can be configured using any type of commonly used memory medium such as a Hard Disk Drive (HDD), an optical disk, a memory card, or a Random Access Memory (RAM).

The receiving unit 101, the generating unit 102, and the output unit 103 of the communication control device 100; as well as the receiving unit 201, the determining unit 202, the MKB processing unit 203, and the group control unit 204 of the communication device 200 can be implemented, for example, by making a processor such as a Central Processing Unit (CPU) to execute programs, that is, using software; or using hardware such as an Integrated Circuit (IC); or using a combination of software and hardware.

Figure 5:
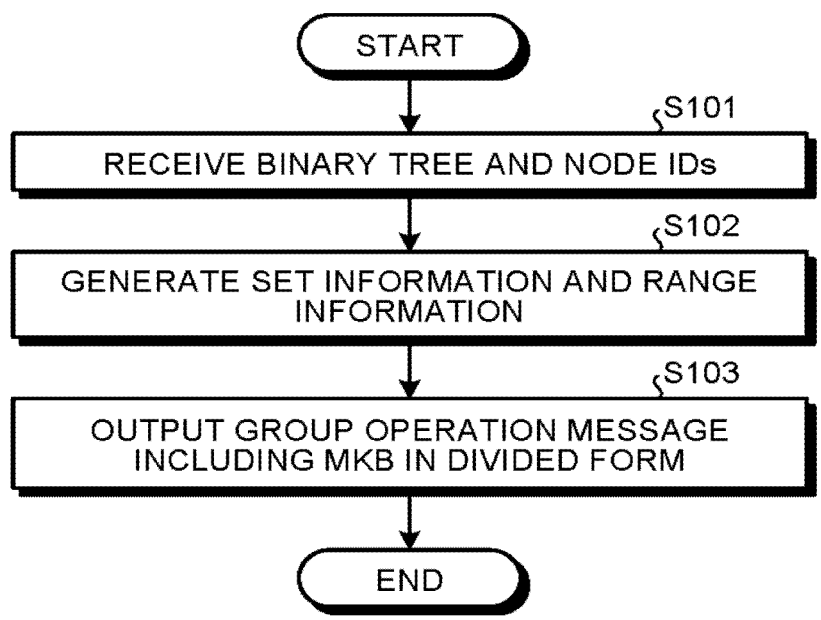
FIG. 5 is a flowchart for explaining a communication control operation according to the embodiment.

Explained below with reference to FIG. 5 is a communication control operation performed by the communication control device 100 according to the present embodiment. FIG. 5 is a flowchart for explaining an example of the communication control operation according to the present embodiment.

The receiving unit 101 receives the complete binary tree T (or the partial tree T' of the complete binary tree T), and receives the node IDs of the leaf nodes corresponding to the communication devices 200 belonging to a group (Step S101). Alternatively, the device IDs of the communication device 200 belonging to the group can be received, and the node IDs of the leaf nodes corresponding to the communication devices 200 having the received device IDs can be obtained. Then, based on the complete binary tree T (or the partial tree T') and the node IDs, the generating unit 102 performs a generation operation for generating set information and range information (Step S102). Subsequently, the generating unit 102 generates a group operation message that includes the set information and the range information. The output unit 103 outputs the group operation message (Step S103).

Given below are the details of the generation operation performed at Step S102. In the generation operation, a tracing operation is recursively performed from a root node R of the partial tree T' of the complete binary tree T with priority to the left side or with priority to the right side. Herein, priority to the left side implies generation of the set information and the range information in a sequential manner from the leftmost leaf node of the partial tree T' toward the rightmost leaf node. Alternatively, priority to the right side implies generation of the set information and the range information in a sequential manner from the rightmost leaf node of the partial tree T' toward the leftmost leaf node. The generating unit 102 can generate the set information either with priority to the left side or with priority to the right side.

The generation operation outputs a list S of node IDs of the high M number of nodes and outputs a list O of sets (S, minr, maxr) where minr represents the lower limit value and maxr represents the upper limit value of the indexes of the leaf nodes corresponding to the list S. Herein, the list S is equivalent to the set information, and minr and maxr are equivalent to the range information. In the following explanation, addition of the node ID of a node n in the list S is sometimes simply expressed as addition of the node n in the list S.

In the following explanation, regarding a partial tree in which the node n is the root node, LML(n) and RML(n) represent the functions that return the node index of the leftmost leaf node and the rightmost leaf node, respectively. Moreover, a set L represents the set of leaf nodes of the partial tree T'. Furthermore, a set G represents the set of leaf nodes, from among the set L, that belong to the group.

The generation operation includes the following steps, for example.
(S1) Initialize O and S to NULL, initialize minr to LML(R), and initialize maxr to RML(R).
(S2) Regarding a node C being currently traced, in the case in which the node C is included in the set L, when the node C is included in the set G, add the node C in the list S and mark the node C as "CS applicable". However, when the node C is not included in the set G, mark the node C as "CS non-applicable".
(S3) If the node C is not included in the set L and if the child nodes on the left and right sides of the node C are marked as "CS non-applicable", the node C is marked as "non CS applicable".
(S4) If the node C is not included in the set L and if the child nodes on the left and right sides of the node C are marked as "CS applicable", the node C is marked as "CS applicable" as well as the child nodes on the left and right sides are removed from the list S and the node C is added in the list S.
(S5) If the node C is not included in the set L and if the child node on one side of the node C is marked as "CS applicable" but the child node on the other side of the node C is marked as "CS non-applicable", when |S|>M holds true (i.e., when the number of elements in the list S is greater than M), S[0:M] represents the list of M number of nodes from the start of the list S, maxr=RML(S[M−1]) represents priority to the left side, and minr=LML(S[M−1]) represents priority to the right side. Then, (S[0:M], minr, maxr) is added to the set O; S[0:M] is removed from the list S; minr=maxr+1 is set in the case of priority to the left side; and maxr=minr−1 is set in the case of priority to the right side.
(S6) When the node C represents the root node R of the partial tree T', maxr=RML(R) is set in the case of priority to the left side, minr=LML(R) is set in the case of priority to the right side, and (S, minr, maxr) is added to the set O.

The marks "CS applicable" and "CS non-applicable" can be implemented as return values of the function performing operations with respect to the node being currently traced, or can be implemented by holding them as attribute values attached to each node. In the case of holding a mark as an attribute value, either the value corresponding to "CS applicable" can be held, or the value corresponding to "CS non-applicable" can be held, or a value corresponding to "CS not-yet-determined" can be held indicating that it is not yet certain whether or not the node is CS applicable.

When the index of a leaf node is expressed as index (b, d) as mentioned earlier, with respect to the node n identified by the node ID (d, b), LML(n) is expressed as index(b, d)×2^($H_T$−d) and RML(n) is expressed as (index(b, d)+1)×2^($H_T$−d)−1. For example, when T=T' is satisfied, the node index of the leftmost node of the partial tree T' is LML(R)=0×2^($H_T$−0)=0; while the node index of the rightmost node of the partial tree T' is RML(R)=(O+1)×2^$H_T$−1=2^$H_T$−1.

In the generation operation, the following information is used as input.
I: a list of device IDs of the communication devices 200 included as group members
T': the partial tree (the root node R of T') of the complete binary T which represents the entire tree
M: the MKB fragment size (the number of nodes included in the MKB fragments)

Figure 6:
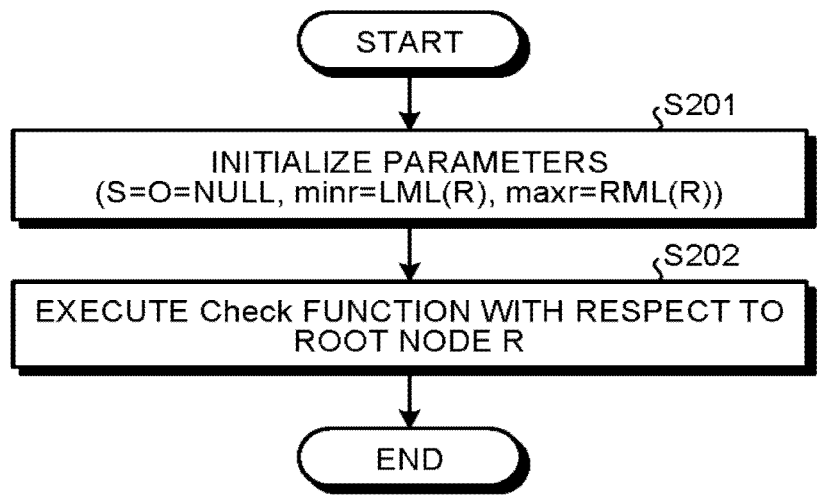
FIG. 6 is a flowchart for explaining a generation operation according to the embodiment.

Moreover, in the generation operation, the list O of (S, minr, maxr) is output.
S: the list of nodes included in the MKB fragments
minr: the lower limit value of the node indexes of the leaf nodes with respect to the list S
maxr: the upper limit value of the node indexes of the leaf nodes with respect to the list S FIG. 6 is a flowchart for explaining an example of the generation operation. The generating unit 102 initializes the parameters to be used in the generation operation (Step S201). For example, the generating unit 102 initializes the list S and the list O to empty (NULL), initializes minr to LML(R), and initializes maxr to RML(R).

The generating unit 102 executes a Check( ) function with respect to the root node R (Step S202). The Check( ) function is recursively executed with respect to the child nodes of the specified node, and the list O is output as a result.

Figure 7:
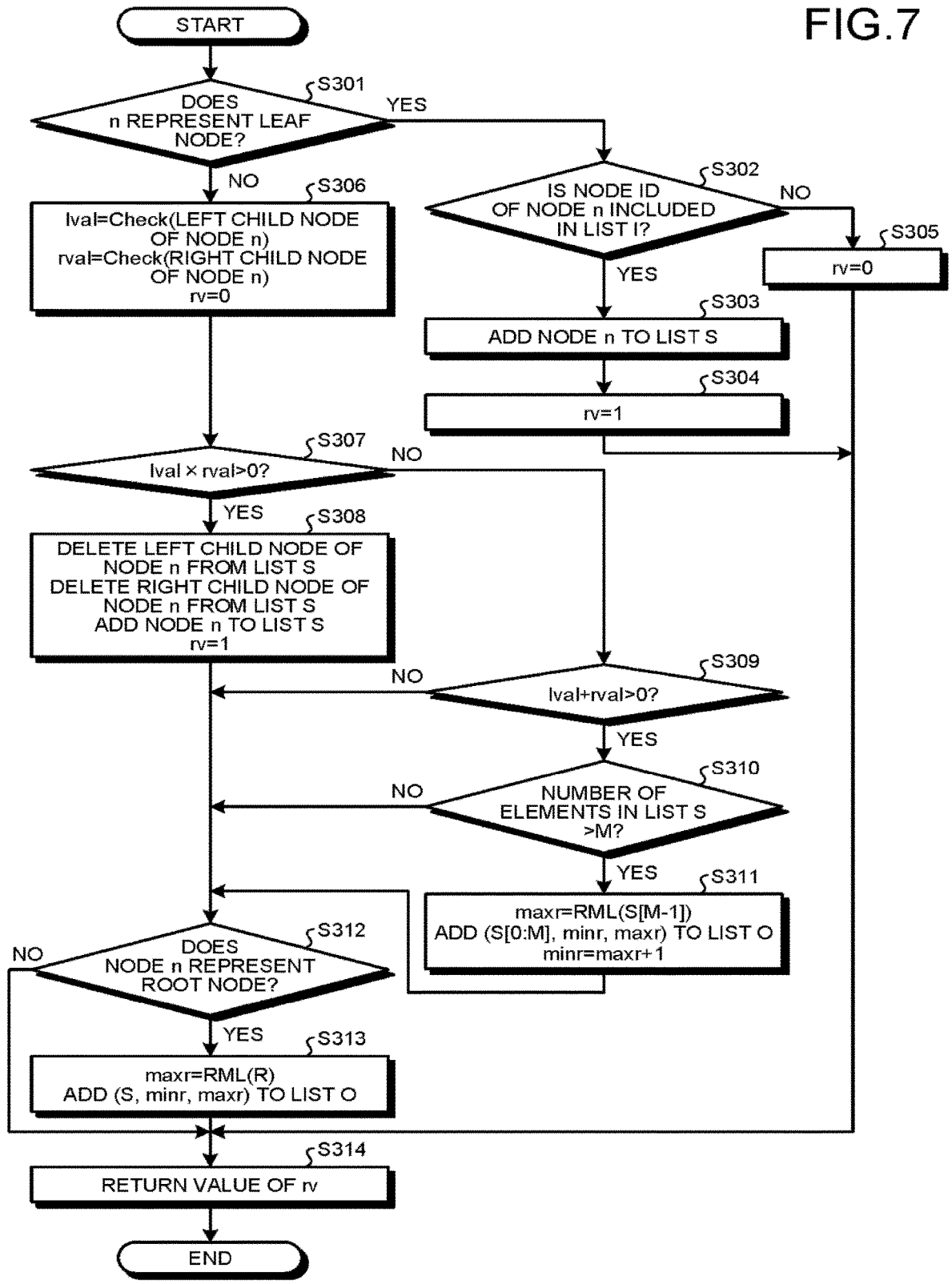
FIG. 7 is a flowchart for explaining a Check( ) function in the case of priority to the left side.

FIG. 7 is a flowchart for explaining an example of the Check( ) function in the case of priority to the left side. In FIG. 7 are illustrated operations performed in the case when the Check( ) function having priority to the left side is called with respect to a particular node n.

Firstly, it is determined whether or not the node n is a leaf node (Step S301). If the node n is a leaf node (Yes at Step S301), then it is determined whether or not the node ID of the node n is included in the list I (Step S302). If the node ID of the node n is included in the list I (Yes at Step S302), then the node n is added to the list S (Step S303). Moreover, rv is set to "1" (Step S304). Herein, rv represents the parameter for setting whether the node is "CS applicable" or "CS non-applicable". In the example illustrated in FIG. 7, rv=1 implies "CS applicable" and rv=0 implies "CS non-applicable". Meanwhile, if the node ID of the node n is not included in the list I (No at Step 3302), then rv is set to "0" (Step S305).

At Step S301, if it is determined that the node n is not a leaf node (No at Step S301); lval is set to Check(left child node of node n), rval is set to Check(right child node of node n), and rv is set to "0" (Step S306).

Subsequently, it is determined whether or not lval×rval is greater than "0" (Step S307). That is equivalent to determining whether the left child node as well as the right child node is "CS applicable". If lval×rval is greater than "0" (Yes at Step S307), then the left child node and the right child node of the node n are deleted from the list S; the node n is added to the list S; and rv is set to "1" (Step S308).

Meanwhile, if lval×rval is not greater than "0", that is, if lval×rval is equal to "0" (No at Step S307), then it is determined whether or not (lval+rval) is greater than "0"

(Step S309). That is equivalent to determining whether either one of the left child node and the right child node is "CS applicable".

If (lval+rval) is greater than "0" (Yes at Step S309), it is determined whether or not the number of elements in the list S has exceeded M (Step S310). If the number of elements in the list S has exceeded M (Yes at Step S310), then maxr is set to RML(S[M−1]); (S[0:M], minr, maxr) is added to the list O; and minr is set to maxr+1 (Step S311).

After the operation at Step S308 or after the operation at Step S311, if it is determined that (lval+rval) is not greater than "0" (No at Step S309) or if the number of elements in the list S is not exceeding M (No at Step S310); then it is determined whether or not the node n is the root node (Step S312).

If the node n is the root node (Yes at Step S312), then maxr is set to RML(R), and (S, minr, maxr) is added to the list O (Step S313). After the operation at Step S304, or after the operation at Step S305, or after the operation at Step S313, or if the node n is not the root node (No at Step S312); the value of rv is returned (Step S314) and the Check function ends.

Figure 8:
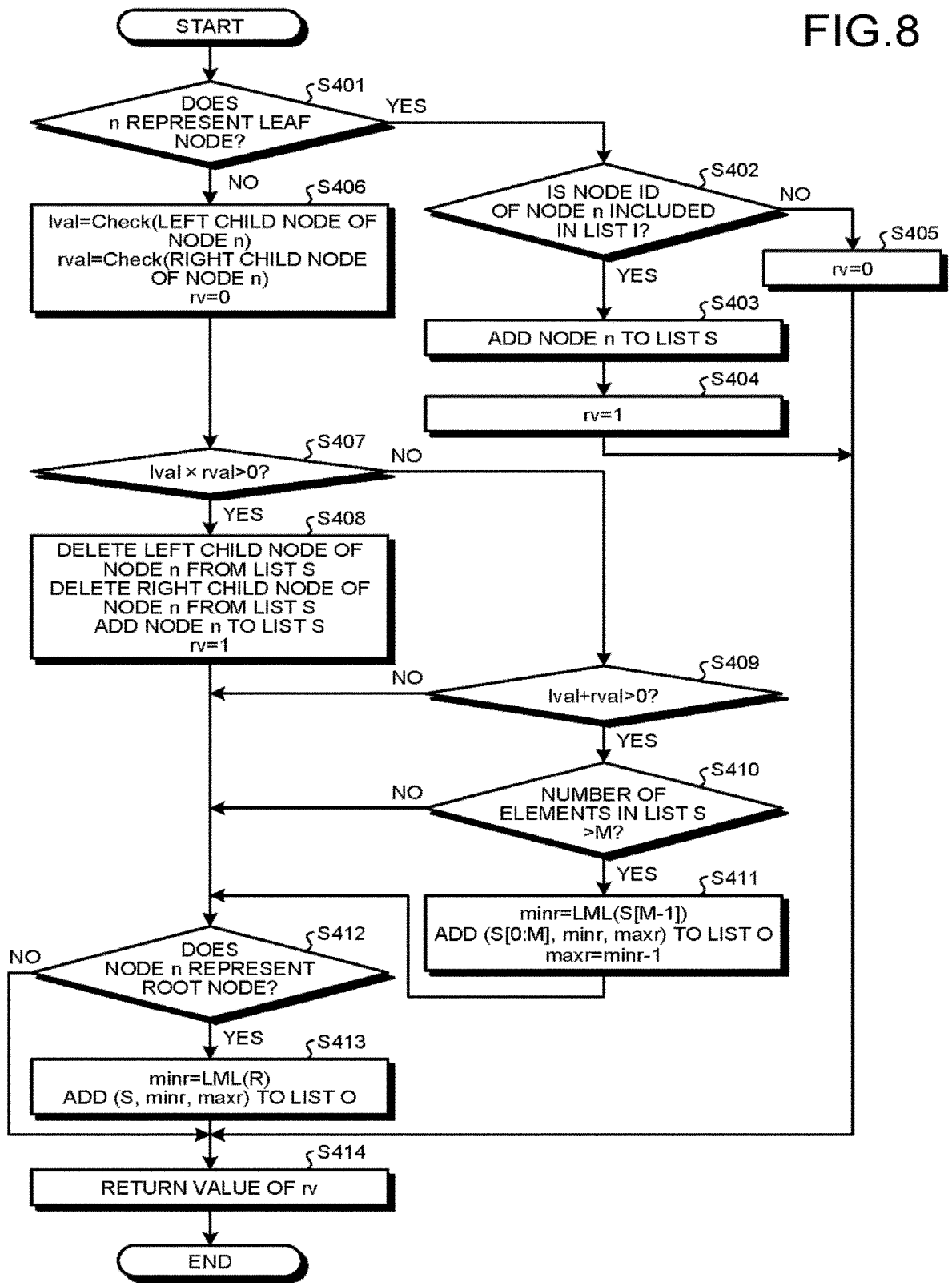
FIG. 8 is a flowchart for explaining the Check( ) function in the case of priority to the right side.

FIG. 8 is a flowchart for explaining an example of the Check( ) function in the case of priority to the right side. In the case of priority to the right side, except for the operations performed at Step S411 and Step S413, the operations are identical to the Check( ) function in the case of priority to the left side (FIG. 7). Hence, the explanation of identical operations is not repeated.

At Step S411, minr is set to LML(S[M−1]); (S[0:M], minr, maxr) is added to the list O; and maxr is set to minr−1 (Step S411). At Step S413, minr is set to LML(R), and (S, minr, maxr) is added to the list O (Step S413).

FIG. 9 is a diagram illustrating an example of a pseudo code for performing the generation operation in the case of priority to the left side. In FIG. 9, Input I, T, R, and M correspond to the list I, the partial tree T', the node R of the partial tree T', and the MKB fragment size M, respectively. Moreover, Output O corresponds to the list O. Furthermore, rightmost leaf number(n) corresponds to RML(n).

Figure 10:
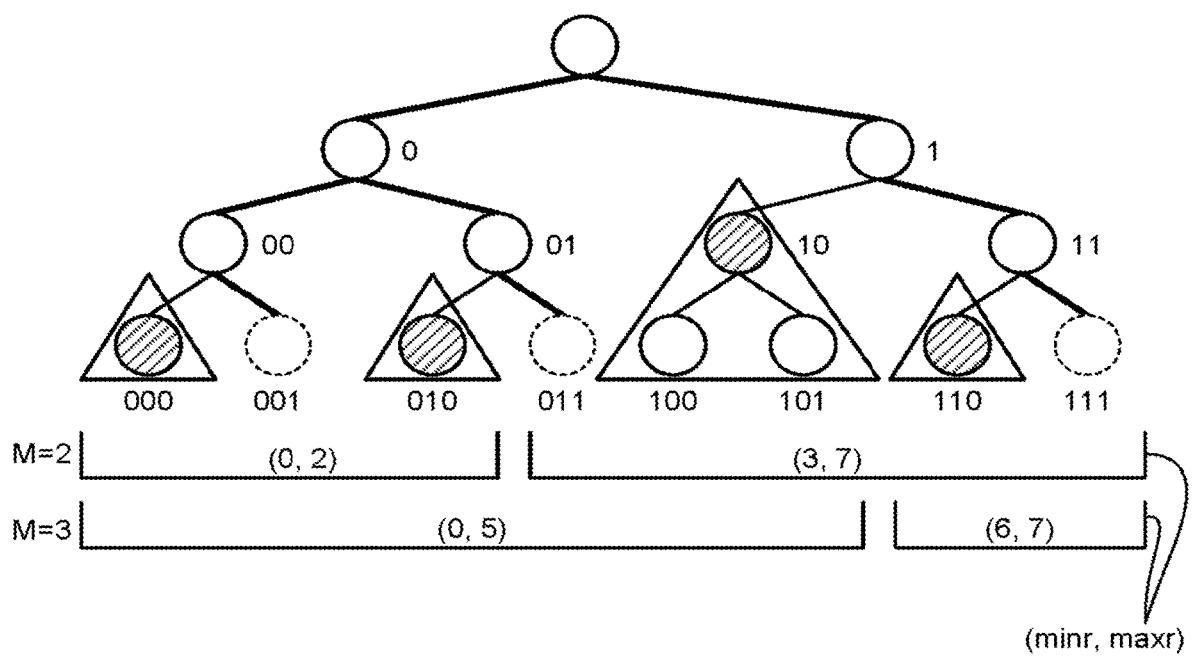
FIG. 10 is a diagram illustrating an example of the result of performing the generation operation.

FIG. 10 is a diagram illustrating an example of the result of performing the generation operation. In FIG. 10 is illustrated an example of the result of performing the generation operation in the case in which T'=T holds true and priority is given to the left side with respect to the complete binary tree T illustrated in FIG. 1, which is the entire tree having $H_T=3$ (the number of leaf nodes is eight).

In the example illustrated in FIG. 10, the following list I is provided as an input parameter. Each element of the list I represents a device ID in binary notation.

I=(000, 010, 100, 101, 110)

When M=2 holds true, the list O representing the output of the generation operation includes the following two lists S.

S=[(3,000), (3,010)], (minr, maxr)=(0, 2)
S=[(2, 10), (3, 110)], (minr, maxr)=(3, 7)

When M=3 holds true, the list O representing the output of the generation operation includes the following two lists S.

S=[(3,000), (3,010), (2, 10)], (minr, maxr)=(0, 5)
S=[(3, 110)], (minr, maxr)=(6, 7)

In the case of including MKB fragments in the set information, for example, Enc(node key of node i, group key) can be calculated for each node included in the list S, and can be output in a corresponding manner to the index of the node.

As described above, according to the present embodiment, while obtaining partial trees including only the leaf nodes belonging to a group, MKB division (generation of the list S of partial trees each having M number of nodes) can be performed. For that reason, the generated MKB fragments can be sent without having to wait until, for example, all partial trees are obtained. As a result, for example, as compared to a method in which all partial trees are obtained before an MKB is divided into MKB fragments (a first modification example described later), it becomes possible to reduce the amount of calculation and the transmission delay of the MKB fragments.

Figure 11:
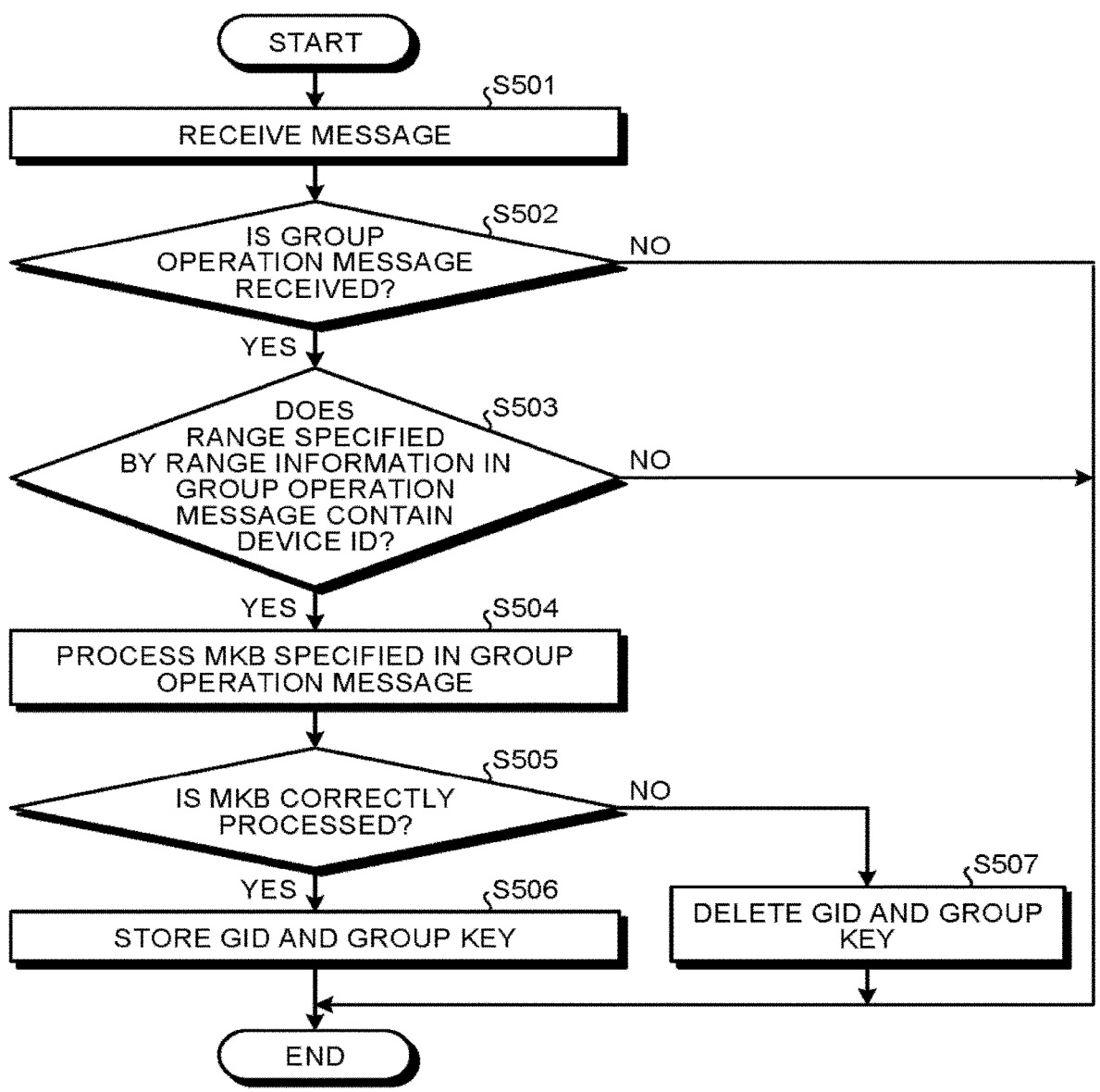
FIG. 11 is a flowchart for explaining a group control operation according to the embodiment.

Explained below with reference to FIG. 11 is a group control operation performed by the communication device 200 according to the present embodiment. FIG. 11 is a flowchart for explaining an example of the group control operation according to the present embodiment.

The receiving unit 201 receives a message from an external device such as the communication control device 100 (Step S501). The receiving unit 201 determines whether or not the received message is a group operation message (Step S502). If the received message is not a group operation message (No at Step S502), then the group control operation is ended. As described earlier, any message other than a group operation message is sent to the module that needs to process the message, and is appropriately processed.

When the received message is a group operation message (Yes at Step S502), the determining unit 202 determines whether or not the range specified by the range information in the group operation message contains the device ID stored in the device ID storing unit 224 (Step S503).

If the range specified by the range information does not contain the device ID (No at Step S503), then the communication device 200 is not the target device for group operation, and the group control operation is ended. When the range specified by the range information contains the device ID (Yes at Step S503), the MKB processing unit 203 processes the MKB fragment specified in the group operation message (Step S504).

The MKB processing unit 203 determines whether or not the MKB (the MKB fragment) is correctly processed (Step S505). If the MKB is correctly processed (Yes at Step S505), then the group control unit 204 stores the GID, which is specified in the group operation message, in the GID storing unit 221 and stores the group key, which is obtained as a result of the MKB processing, in the group key storing unit 222 (Step S506). However, when the MKB is not correctly processed (No at Step S505), the group control unit 204 deletes the GID, which is specified in the group operation message, from the GID storing unit 221 and deletes the group key from the group key storing unit 222 (Step S507).

In this way, in the communication control device according to the present embodiment, dynamic group management can be achieved while ensuring scalability. Moreover, for the purpose of performing group management, instead of sending an entire MKB, information (MKB fragments) obtained by dividing the MKB is sent. That enables achieving reduction in the communication load. At that time, since the information for setting the range of communication devices to be subjected to group operations is sent along with the MKB fragments, unintended group operations can be avoided.

First Modification Example

In the embodiment described above, while obtaining partial trees including only the leaf nodes belonging to a group, an MKB is divided and range information of the MKB in the divided form (MKB fragments) is generated. In the first modification example, a list of sorted partial trees including only the leaf nodes belonging to a group is obtained, and then the list of partial trees is divided to generate MKB fragments, followed by generating range information of the MKB fragments.

Figure 12:
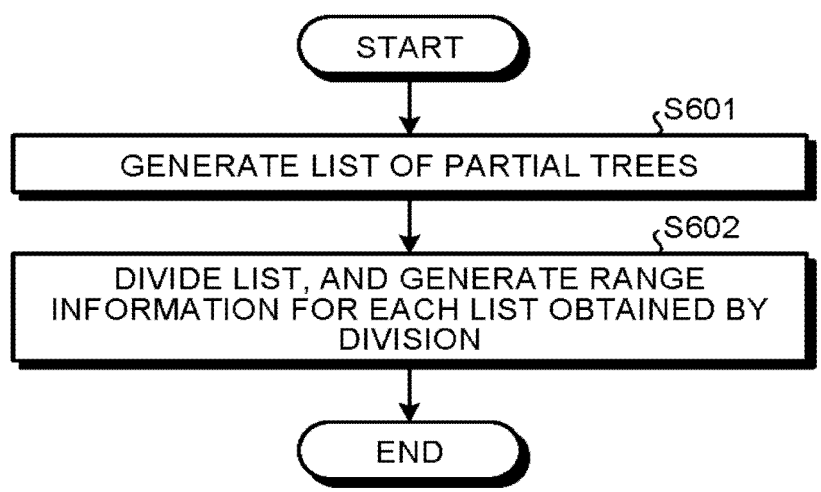
FIG. 12 is a flowchart for explaining a generation operation according to a first modification example.

FIG. 12 is a flowchart for explaining an example of the generation operation according to the first modification example. The generating unit 102 repeatedly performs, either from the leftmost leaf node toward the rightmost leaf node or from the rightmost leaf node toward the leftmost leaf node, an operation of obtaining partial trees each of which includes only the leaf nodes identified by node IDs; and obtains a sorted list of partial trees including one or more partial trees (Step S601). Herein, sorting implies arranging the partial trees in ascending order or descending order of indexes. For example, in the case of priority to the left side, the partial trees are sorted in such a way that the node indexes of the leftmost leaf node or the rightmost leaf node of the index R of the root nodes of the partial trees (LML(R) or RML(R)) are arranged in ascending order. In the case of priority to the right side, the partial trees are sorted in such a way that the node indexes of the leftmost leaf node or the rightmost leaf node of the root nodes of the partial trees (LML(R) or RML(R)) are arranged in descending order.

Subsequently, the generating unit 102 divides the obtained list of partial trees into sets each of which includes a predetermined number of (M (natural number) partial trees, and obtains the range information of the indexes that are assigned to the leaf nodes of the partial trees included in each set (Step S602).

In the first modification example, after the list of partial trees is obtained, sets of M number of partial trees (lists of partial trees) are further obtained. For that reason, the amount of calculation becomes equal to O(L+L/M) (where L represents the number of leaf nodes).

Figure 13:
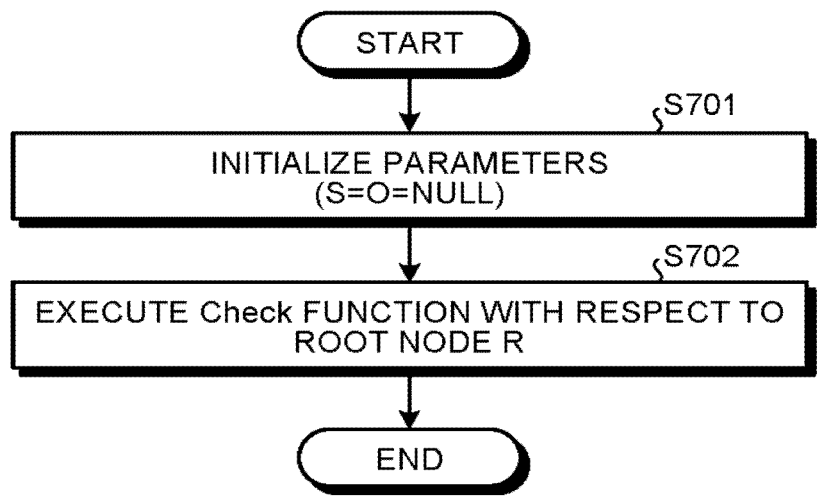
FIG. 13 is a flowchart for explaining a list generation operation.

FIG. 13 is a flowchart for explaining an example of the list generation operation performed at Step S601. The generating unit 102 initializes the parameters to be used (Step S701). For example, the generating unit 102 initializes the list S and list O to empty (NULL). Then, the generating unit 102 executes the Check( ) function with respect to the root node R (Step S702). The Check function according to the first modification example is recursively executed with respect to the child nodes of the specified node, and the list S is output as a result.

Figure 14:
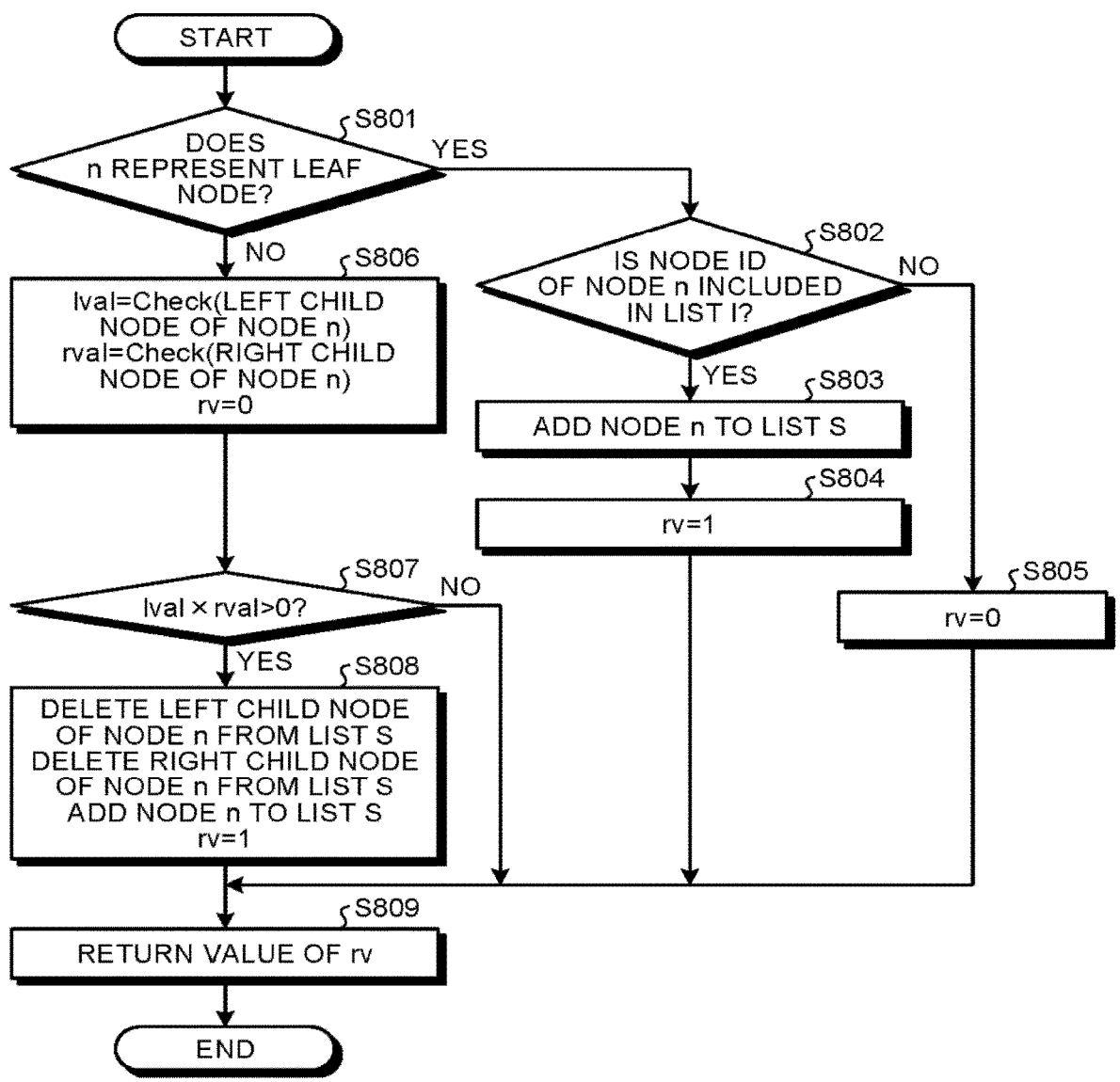
FIG. 14 is a flowchart for explaining the Check( ) function according to the first modification example in the case of priority to the left side.

FIG. 14 is a flowchart for explaining an example of the Check( ) function according to the first modification example in the case of priority to the left side. In FIG. 14 are illustrated operations performed in the case when the Check( ) function having priority to the left side is called with respect to a particular node n.

The operations from Step S801 to Step S807 are identical to the operations from Step S301 to Step S307 illustrated in FIG. 7. Hence, the explanation is not repeated.

At Step S807, if lval×rval is determined to be greater than "0" (Yes at Step S807), then the left child node and the right child node of the node n are deleted from the list S; the node n is added to the list S; and rv is set to "1" (Step S808).

On the other hand, if lval×rval is not greater than "0" (No at Step S807), the value of rv is returned after the operation at Step S804, or after the operation at Step S805, or after the operation at Step S808 (Step S809), and the Check function is ended.

Given below is the explanation of the range information calculation operation performed at Step S602. In the range information calculation operation, the list S obtained in the list generation operation (Step S601) is divided into lists F each of which includes M number of elements, and a set (minr, maxr) is calculated regarding the lower limit value minr and the maximum limit value maxr of the indexes of the leaf nodes of each partial tree included in each list F. Then, sets of the lists F, the lower limit values minr, and the upper limit values maxr are output. In this example, the lists F are equivalent to the set information.

Regarding the i-th list F (wherein 1≤i≤N, N represents the number of divisions, and N=ceiling(|S|/M)), the lower limit value minr and the upper limit value maxr are calculated in the following manner.

for the first list F, minr=0
for the i-th list F, minr=maxr+1 of the (i−1)-th list F (where i>1)
for the i-th list F, maxr=index of the rightmost leaf node of the last element (partial tree) of the i-th list F (where i<N)
for the N-th list F, maxr=index of the rightmost leaf node of the partial tree T'

FIG. 15 is a diagram illustrating an example of the pseudo code for performing the generation operation according to the first modification example in the case of priority to the left side. In the modification example too, the input (Input I, T, R, M) and the output (Output O) are identical to FIG. 9. In FIG. 15, fragment(S) is equivalent to the range information calculation operation.

Second Modification Example

When a new communication device 200 (a leaf node) is added to a group, the generating unit 102 can again perform the generation operation by using the node IDs of the leaf nodes belonging to the group after the new addition. Moreover, when a particular communication device 200 (a leaf node) withdraws from a group, the generating unit 102 can again perform the generation operation by using the node IDs of the leaf nodes belonging to group after the deletion. As a result, dynamic group management can be achieved while ensuring scalability.

Figure 16:
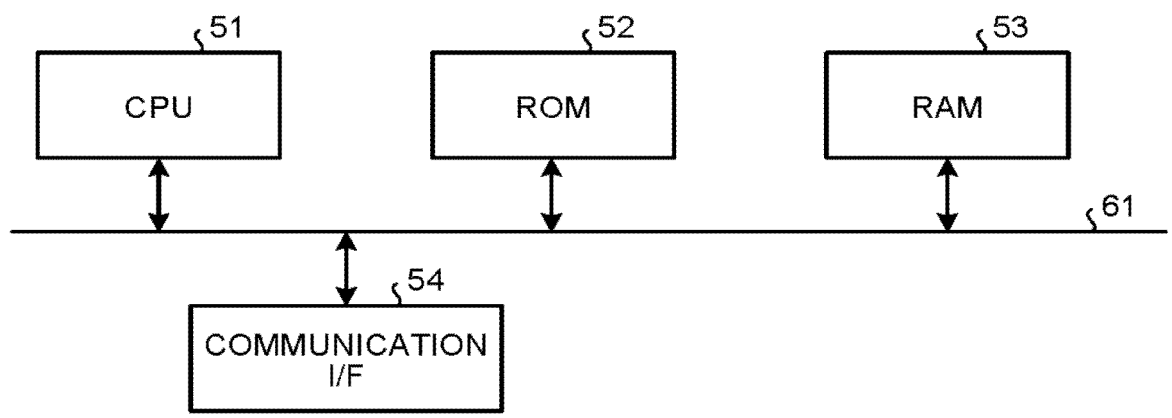
FIG. 16 is a hardware configuration diagram of the communication control device according to the embodiment.

Explained below with reference to FIG. 16 is a hardware configuration of the communication control device according to the present embodiment. FIG. 16 is an explanatory diagram for explaining a hardware configuration of the communication control device according to the present embodiment.

The communication control device according to the present embodiment includes a controller such as a Central Processing Unit (CPU) 51, memory devices such as a Read Only Memory (ROM) 52 and a Random Access Memory (RAM) 53, a communication I/F 54 that establishes connection with a network and performs communication, and a bus 61 that connects the constituent elements to each other.

Herein, programs executed in the devices (the communication control device and the communication device) according to the present embodiment are stored in advance in the ROM 52.

Alternatively, the programs executed in the devices according to the present embodiment can be recorded as installable or executable files in a recording medium such as a Compact Disk Read Only Memory (CD-ROM), a flexible disk (FD), a Compact Disk Recordable (CD-R), or a Digital Versatile Disk (DVD); and can be provided as a computer program product.

Still alternatively, the programs executed in the devices according to the present embodiment can be stored in a computer connected to a network such as the Internet, and can be downloaded via the network. Still alternatively, the programs executed in the devices according to the present embodiment can be distributed via a network such as the Internet.

The programs executed in the devices according to the present embodiment can make a computer function as the constituent elements described above. In that computer, the CPU 51 can read the programs from a computer-readable memory medium, load them in a main memory device, and execute them.

While a certain embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A communication control device comprising:
one or more processors configured to:
output, at least to a communication device associated to a leaf node belonging to a group, set information and range information that are generated based on a binary tree, in which each of leaf nodes has an index assigned thereto, and based on node IDs that, from among leaf nodes, enable identification of leaf nodes belonging to the group,
wherein the set information indicates a set of a predetermined number of partial trees of the binary tree and contains node IDs of root nodes of the partial trees, each partial tree including only the leaf node identified by the node ID, and
the range information indicates a lower limit value and an upper limit value of indices assigned to a plurality of leaf nodes of the predetermined number of partial trees included in the set,
wherein,
when a leaf node is added to the group, the set information and the range information are again generated by using node IDs of leaf nodes belonging to the group to which the leaf node has been added, and
the set information contains key information that enables a communication device corresponding to a leaf node of the partial tree included in the set to derive a group key.

2. The device according to claim 1, wherein the set information and the range information are generated by repeatedly performing, either from a leftmost leaf node toward a rightmost leaf node or from the rightmost leaf node toward the leftmost leaf node, a tracing operation that includes an operation of obtaining the set information, which indicates a set of the predetermined number of the partial trees each including only the leaf node identified by the node ID, and an operation of obtaining the range information of the indices of the leaf nodes included in the obtained set.

3. The device according to claim 1, wherein the set information and the range information are generated by:
repeatedly performing, either from a leftmost leaf node toward a rightmost leaf node or from the rightmost leaf node toward the leftmost leaf node, an operation of obtaining the partial trees each including only the leaf node identified by the node ID and obtaining one or more of the partial trees,
dividing the obtained partial trees into sets each including the predetermined number of partial trees, and
obtaining the range information of the indices assigned to the leaf nodes of the partial trees included in each of the sets.

4. A communication control method comprising:
outputting, at least to a communication device associated to a leaf node belonging to a group, set information and range information that are generated based on a binary tree, in which each of leaf nodes has an index assigned thereto, and based on node IDs that, from among leaf nodes, enable identification of leaf nodes belonging to the group,
wherein the set information indicates a set of a predetermined number of partial trees of the binary tree and contains node IDs of root nodes of the partial trees, each partial tree including only the leaf node identified by the node ID, and
the range information indicates a lower limit value and an upper limit value of indices assigned to a plurality of leaf nodes of the predetermined number of partial trees included in the set,
wherein,
when a leaf node is added to the group, the set information and the range information are again generated by using node IDs of leaf nodes belonging to the group to which the leaf node has been added, and
the set information contains key information that enables a communication device corresponding to a leaf node of the partial tree included in the set to derive a group key.

5. A computer program product having a non-transitory computer-readable medium including programmed instructions, wherein the instructions, when execute by a computer, cause the computer to perform:
outputting, at least to a communication device associated to a leaf node belonging to a group, set information and range information that are generated based on a binary tree, in which each of leaf nodes has an index assigned thereto, and based on node IDs that, from among leaf nodes, enable identification of leaf nodes belonging to the group,
wherein the set information indicates a set of a predetermined number of partial trees of the binary tree and contains node IDs of root nodes of the partial trees, each partial tree including only the leaf node identified by the node ID, and
the range information indicates a lower limit value and an upper limit value of indices assigned to a plurality of leaf nodes of the predetermined number of partial trees included in the set,
wherein,
when a leaf node is deleted from the group, the set information and the range information are again generated by using node IDs of leaf nodes belonging to the group from which the leaf node has been deleted, and
the set information contains key information that enables a communication device corresponding to a leaf node of the partial tree included in the set to derive a group key.

6. A communication system comprising:
one or more processors configured to:
output, at least to a communication device associated to a leaf node belonging to a group, set information and range information that are generated based on a binary tree, in which each of leaf nodes has an index assigned thereto, and based on node IDs that, from among leaf nodes, enable identification of leaf nodes belonging to the group; and determine whether or not the range information contains an index assigned in advance, wherein the set information indicates a set of a predetermined number of partial trees of the binary tree and contains node IDs of root nodes of the partial trees, each partial tree including only the leaf node identified by the node ID, and the range information indicates a lower limit value and an upper limit value of indices assigned to a plurality of leaf nodes of the predetermined number of partial trees included in the set, wherein, when a leaf node is deleted from the group, the set information and the range information are again generated by using node IDs of leaf nodes belonging to the group from which the leaf node has been deleted, and the set information contains key information that enables a communication device corresponding to a leaf node of the partial tree included in the set to derive a group key.

7. A communication device comprising:

one or more processors configured to:

receive set information and range information that are generated based on a binary tree, in which each of leaf nodes has an index assigned thereto, and based on node IDs that, from among leaf nodes, enable identification of leaf nodes belonging to a group, wherein the set information indicates a set of a predetermined number of partial trees of the binary tree and contains node IDs of root nodes of the partial trees, each partial tree including only the leaf node identified by the node ID, and the range information indicates a lower limit value and an upper limit value of indices assigned to a plurality of leaf nodes of the predetermined number of partial trees included in the set, wherein the set information and the range information are generated by repeatedly performing, either from a leftmost leaf node toward a rightmost leaf node or from the rightmost leaf node toward the leftmost leaf node, a tracing operation that includes an operation of obtaining the set information, which indicates a set of the predetermined number of the partial trees each including only the leaf node identified by the node IDs, and an operation of obtaining the range information of the indices of the leaf nodes included in the obtained set.

8. The communication device according to claim 7, wherein the one or more processors is/are configured to:

determine whether or not the range information contains a device ID of the communication device; and perform, when it is determined that the range information contains the device ID, processing using the set information, and not perform, when it is determined that the range information does not contain the device ID, the processing using the set information.

9. The communication device according to claim 7, wherein the set information and the range information are generated by:

obtaining one or more of partial trees by repeatedly performing, either from a leftmost leaf node toward a rightmost leaf node or from the rightmost leaf node toward leftmost the leaf node, an operation of obtaining partial tree including only the leaf nodes identified by the node IDs, dividing the obtained partial trees into sets each including the predetermined number of partial trees, and obtaining the range information of the indices assigned to leaf nodes of the partial trees included in each of the sets.

10. The communication device according to claim 7, wherein the set information contains key information that enables communication devices, which are associated to leaf nodes of the partial tree included in the set, to derive a group key.

11. A communication method comprising:

receiving set information and range information that are generated based on a binary tree, in which each of leaf nodes has an index assigned thereto, and based on node IDs that, from among leaf nodes, enable identification of leaf nodes belonging to a group, wherein the set information indicates a set of a predetermined number of partial trees of the binary tree and contains node IDs of root nodes of the partial trees, each partial tree including only the leaf node identified by the node ID, and the range information indicates a lower limit value and an upper limit value of indices assigned to a plurality of leaf nodes of the predetermined number of partial trees included in the set, wherein the set information and the range information are generated by repeatedly performing, either from a leftmost leaf node toward a rightmost leaf node or from the rightmost leaf node toward the leftmost leaf node, a tracing operation that includes an operation of obtaining the set information, which indicates a set of the predetermined number of the partial trees each including only the leaf node identified by the node IDs, and an operation of obtaining the range information of the indices of the leaf nodes included in the obtained set.

12. A computer program product having a non-transitory computer readable medium including programmed instructions, wherein the instructions, when executed by a computer, cause the computer to perform:

receiving set information and range information that are generated based on a binary tree, in which each of leaf nodes has an index assigned thereto, and based on node IDs that, from among leaf nodes, enable identification of leaf nodes belonging to a group, wherein the set information indicates a set of a predetermined number of partial trees of the binary tree and contains node IDs of root nodes of the partial trees, each partial tree including only the leaf node identified by the node ID, and the range information indicates a lower limit value and an upper limit value of indices assigned to a plurality of leaf nodes of the predetermined number of partial trees included in the set, wherein the set information and the range information are generated by repeatedly performing, either from a leftmost leaf node toward a rightmost leaf node or from the rightmost leaf node toward the leftmost leaf node, a tracing operation that includes an operation of obtaining the set information, which indicates a set of the predetermined number of the partial trees each including only the leaf node identified by the node IDs, and an operation of obtaining the range information of the indices of the leaf nodes included in the obtained set.

13. A communication system comprising:
one or more processors configured to:
receive set information and range information that are generated based on a binary tree, in which each of leaf nodes has an index assigned thereto, and based on node IDs that, from among leaf nodes, enable identification of leaf nodes belonging to a group; and
determine whether or not the range information contains an index assigned in advance, wherein
the set information indicates a set of a predetermined number of partial trees of the binary tree and contains node IDs of root nodes of the partial trees, each partial tree including only the leaf node identified by the node ID, and
the range information indicates a lower limit value and an upper limit value of indices assigned to a plurality of leaf nodes of the predetermined number of partial trees included in the set,
wherein the set information and the range information are generated by repeatedly performing, either from a leftmost leaf node toward a rightmost leaf node or from the rightmost leaf node toward the leftmost leaf node, a tracing operation that includes an operation of obtaining the set information, which indicates a set of the predetermined number of the partial trees each including only the leaf node identified by the node IDs, and an operation of obtaining the range information of the indices of the leaf nodes included in the obtained set.

* * * * *